United States Patent [19]

Groll et al.

[11] Patent Number: 4,537,721
[45] Date of Patent: Aug. 27, 1985

[54] CU-PC DYESTUFFS

[75] Inventors: Manfred Groll, Leverkusen; Dieter Ockelmann, Cologne, both of Fed. Rep. of Germany

[73] Assignee: Bayer Aktiengesellschaft, Leverkusen, Fed. Rep. of Germany

[21] Appl. No.: 561,609

[22] Filed: Dec. 14, 1983

[30] Foreign Application Priority Data

Dec. 29, 1982 [DE] Fed. Rep. of Germany ....... 3248466

[51] Int. Cl.³ .............................................. C09B 47/32
[52] U.S. Cl. ............................. 260/242.2; 260/245.1; 260/245.73; 260/245.79
[58] Field of Search ............. 260/242.2, 245.1, 245.73, 260/245.79

[56] References Cited

U.S. PATENT DOCUMENTS

| 2,863,875 | 12/1958 | Bienert et al. | 260/314.5 |
| 3,210,345 | 10/1965 | Gamlen et al. | 260/245.73 X |
| 3,592,581 | 7/1971 | Shansky et al. | 8/10.1 |
| 3,954,392 | 5/1976 | Dien | 8/7 |
| 4,368,053 | 1/1983 | Eckhardt et al. | 8/102 |

FOREIGN PATENT DOCUMENTS

| 0035470 | 9/1981 | European Pat. Off. . |
| 1049996 | 7/1959 | Fed. Rep. of Germany . |
| 1569783 | 7/1969 | Fed. Rep. of Germany . |
| 446578 | 3/1968 | Switzerland . |

*Primary Examiner*—Richard L. Raymond
*Attorney, Agent, or Firm*—Sprung Horn Kramer & Woods

[57] ABSTRACT

Basic copper phthalocyanine dyestuffs of the general formula

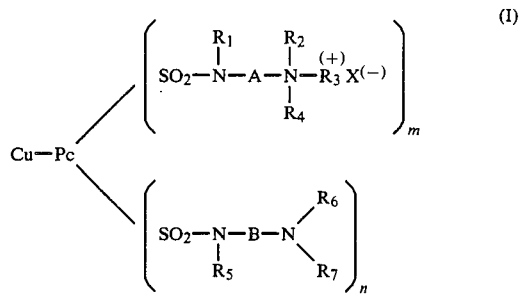

in which
Cu-Pc denotes the radical of an m+n-valent copper phthalocyanine radical,
A denotes alkylene
B denotes a radical of the formula

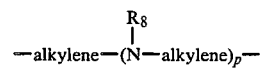

$R_1$ denotes hydrogen or alkyl,
$R_2$, $R_3$ and $R_4$, independently of one another, denote alkyl which can be substituted by hydroxyl or alkoxy groups,
$R_5$ denotes hydrogen, alkyl or aminoalkyl,
$R_6$ and $R_7$, independently of each other, denote hydrogen or alkyl which can be substituted by hydroxyl, alkoxy or amino groups, and
$R_8$ denotes hydrogen or alkyl, or
$R_1$ can form a closed ring with $R_2$,
$R_2$ can form a closed ring with $R_3$,
$R_5$ can form a closed ring with $R_6$ and/or
$R_6$ can form a closed ring with $R_7$,
m denotes a number from 1.0 to 2.5,
n denotes a number from 0 to 1.4,
where
m+n is 1.8 to 2.5,
p denotes 0, 1, 2 or 3 and
$X^{(-)}$ denotes an anion,
are used for dyeing paper.

6 Claims, No Drawings

CU-PC DYESTUFFS

The invention relates to basic copper phthalocyanine dyestuffs of the general formula

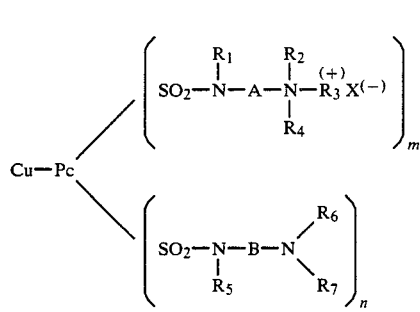

in which
Cu—Pc denotes the radical of an m+n-valent copper phthalocyanine radical,
A denotes alkylene
B denotes a radical of the formula

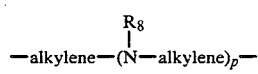

—alkylene—(N—alkylene)$_p$— with $R_8$ above the N, $R_1$ denotes hydrogen or alkyl,
$R_2$, $R_3$ and $R_4$, independently of one another, denote alkyl which can be substituted by hydroxyl or alkoxy groups,
$R_5$ denotes hydrogen, alkyl or aminoalkyl,
$R_6$ and $R_7$, independently of each other other, denote hydrogen or alkyl which can be substituted by hydroxyl, alkoxy or amino groups, and
$R_8$ denotes hydrogen or alkyl, or
$R_1$ can form a closed ring with $R_2$,
$R_2$ can form a closed ring with $R_3$,
$R_5$ can form a closed ring with $R_6$ and/or
$R_6$ can form a closed ring with $R_7$, m denotes a number from 1.0 to 2.5,
n denotes a number from 0 to 1.4,
where
m+n is 1.8 to 2.5,
p denotes 0, 1, 2 or 3 and
$X^{(-)}$ denotes an anion, to their aqueous solutions, to their preparation, and to their use for dyeing paper.

The alkylene radicals preferably have 2–8 C atoms. More particularly, the A alkylene radicals have 2–5 C atoms and the alkylene radicals in B have 2–4 C atoms. Preferred alkyl and alkoxy radicals have 1–4 C atoms.

The radicals $R_1$ and $R_2$ together and $R_5$ and $R_6$ together can represent, for example, an ethylene bridge and then, conjointly with the —N—A—N— or —N—B—N— group respectively, form, for example, a piperazine ring.

The radicals $R_2$ and $R_3$ together and $R_6$ and $R_7$ together can form, conjointly with the nitrogen atom, a 5-, 6- or 7-membered ring, for example a pyrrolidine, piperidine, morpholine or optionally substituted piperazine or azacycloheptane ring. The piperazine ring can be substituted at the nitrogen by a $C_1$–$C_4$-alkyl group, which in turn can carry hydroxyl or amino groups.

The anion can be a customary colourless organic or inorganic anion, for example chloride, bromide, iodide, hydroxyl, hydrogensulphate, sulphate, methosulphate, ethosulphate, formate, acetate, propionate, benzenesulphonate or toluenesulphonate.

Noteworthy dyestuffs of the formula (I) have the formula

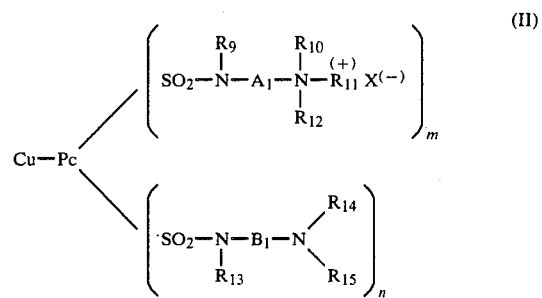

in which
Cu-Pc, p and $X^{(-)}$ have the meaning given in the formula (I),
$A_1$ denotes $C_2$–$C_5$-alkylene,
$B_1$ denotes a radical of the formula $C_2$- or

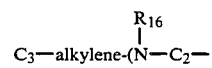

$C_3$—alkylene-(N—$C_2$— or $C_3$-alkylene)$_p$-$R_9$ denotes hydrogen or $C_1$–$C_4$-alkyl,
$R_{10}$, $R_{11}$ and $R_{12}$, independently of one another, denote methyl or $C_2$–$C_4$-alkyl which can be substituted by a $C_1$–$C_4$-alkoxy or one or two hydroxyl groups,
$R_{13}$ denotes hydrogen, methyl or $C_2$–$C_4$-alkyl which can be substituted by an amino group,
$R_{14}$ and $R_{15}$, independently of one another, denote hydrogen, methyl or $C_2$–$C_4$-alkyl which can be substituted by a $C_1$–$C_4$-alkoxy or amino group or one or two hydroxyl groups, and
$R_{16}$ denotes hydrogen or $C_1$–$C_4$-alkyl, or
$R_9$, $R_{10}$ and —N—$A_1$—N— conjointly form a piperazine ring,
$R_{13}$, $R_{14}$ and —N—$B_1$—N— conjointly form a piperazine ring,
$R_{10}$ and $R_{11}$ and/or
$R_{14}$ and $R_{15}$ conjointly with the nitrogen atom form a pyrrolidine, piperazine, morpholine or piperazine ring which can carry a methyl or an optionally hydroxyl- or amino-substituted $C_2$–$C_4$-alkyl radical, and
the sum of m and n=2.0–2.3.

Particularly preferred dyestuffs have the formula (II) in which:
$A_1$ represents 1,2-ethylene or 1,3-propylene,
$R_9$ and $R_{13}$ represent hydrogen or methyl,
$R_{10}$, $R_{11}$ and $R_{12}$, independently of one another, represent methyl, ethyl, 2-hydroxyethyl or 2,3-dihydroxypropyl,
$R_{14}$ and $R_{15}$, independently of each other, represent hydrogen, methyl or ethyl, and
$R_{16}$ represents hydrogen or methyl, or
$R_9$, $R_{10}$ and —N—$A_1$—N— conjointly form a piperazine ring,
$R_{10}$ and $R_{11}$ conjointly with the nitrogen atom form a morpholine ring, and/or
$R_{13}$, $R_{14}$ and —N—$B_1$—N— conjointly form a piperazine ring.

The dyestuffs of the formula (I) are obtained by reacting copper phthalocyaninesulphonyl chlorides of the formula

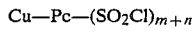

$$Cu-Pc-(SO_2Cl)_{m+n} \quad (III)$$

with m mol of an amine of the formula

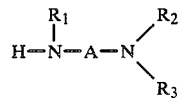

$$\begin{array}{c} R_1 \quad R_2 \\ | \quad / \\ H-N-A-N \\ \quad \backslash \\ \quad R_3 \end{array} \quad (IV)$$

if appropriate then reacting with n mol of an amine of the formula

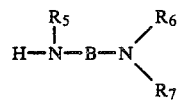

$$\begin{array}{c} R_5 \quad R_6 \\ | \quad / \\ H-N-B-N \\ \quad \backslash \\ \quad R_7 \end{array} \quad (V)$$

possibly in the presence of an acid-binding agent which does not react with the alkylating agent, in water or a mixture of water and a water-miscible organic solvent, where, after the reaction with the amine of the formula (IV), at least one of the basic groups per molecule is quaternised with a compound of the formula

$$R_4-X \quad (VI)$$

either the resulting dyestuffs are isolated or a carboxylic acid of the formula

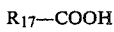

$$R_{17}-COOH \quad (VII)$$

where $R_{17}$ represents hydrogen or optionally chlorine-, hydroxyl-, $C_1$-$C_4$-alkoxy- or carboxyl-substituted $C_1$-$C_4$-alkyl, or mixtures thereof, is added to destroy any excess quaternising agent present, and to bring the dyestuff into solution.

Copper phthalocyaninesulphonyl chlorides of the formula (III) can carry the sulphonyl chloride groups in the 3- or 4-positions of the benzene nuclei. They are obtained in a customary manner by treating copper phthalocyanine or copper phthalocyaninesulphonic acids with chlorosulphonic acid and thionyl chloride, and are isolated by pouring the chlorosulphonic acid solutions onto ice, and filtering off the precipitated copper phthalocyaninesulphonyl chlorides with suction and processing them further in the form of aqueous pastes.

Examples of amines of the formula (II) are: 1-amino-2-dimethylaminoethane, 1-amino-2-diethylaminoethane, 1-methylamino-2-dimethylaminoethane, 1-amino-3-dimethylaminopropane, 1-amino-3-diethylaminopropane, 1-methylamino-3-dimethylaminopropane, 4-amino-1-diethylaminopentane, 2-[(3-aminopropyl)-methylamino]-ethanol, 2,2'-bishydroxyethyl-(3-aminopropyl)-amine, N-(3-aminopropyl)-morpholine, N-(2-aminoethyl)-morpholine, N-(3-aminopropyl)-pyrrolidine, N-(3-aminopropyl)-piperidine, N-methylpiperazine and N-(2-hydroxyethyl)-piperazine.

Examples of amines of the formula (V) are the examples of the formula IV and, additionally, N,N-bis(3-aminopropyl)-amine, N,N-bis(3-aminopropyl)-methylamine, N,N-bis(2-aminoethyl)-amine, N,N-bis-(2-aminoethyl)-methylamine, N,N'-bis-(2-aminoethyl)-1,2-diaminoethane, 1,11-diamino-3,6,9-triazaundecane and N-(2-aminoethyl)-piperazine.

Examples of the aliphatic carboxylic acids of the formula (VII) are formic acid, acetic acid, chloroacetic acid, hydroxyacetic acid, propionic acid, lactic acid, citric acid, 2-methoxyacetic acid and 2-ethoxyacetic acid.

Examples of the quaternising agents (VI) are dimethyl sulphate, diethyl sulphate, methyl p-toluenesulphonate, ethyl p-toluenesulphonate, methyl chloride, methyl bromide, methyl iodide, 3-chloro-1,2-propanediol, 2-chloroethanol and ethylene oxide and propylene oxide in the presence of a compound which provides the $X^{(-)}$ anion.

Examples of acid-binding agents of the abovementioned type are magnesium oxide, magnesium carbonate, calcium oxide, sodium hydrogencarbonate, potassium hydrogencarbonate, sodium carbonate, potassium carbonate, sodium hydroxide solution, potassium hydroxide solution, lithium hydroxide and lithium carbonate.

It is advantageous, for manufacturing reasons, to use the dyestuffs in the form of their liquid formulations. The aqueous dyestuff solutions obtained according to the invention can contain up to 30% by weight of dyestuff.

It is known that paper is dyed increasingly with dyestuffs which have good chemical bleachability, so that, after a chemical bleaching process, for example by means of a chlorine liquor, the machine broke of dyed paper material can be re-used in paper manufacture.

Phthalocyanine dyestuffs based on phthalocyaninesulphonamides have been described, for example, in German Auslegeschriften 1,061,010, 1,064,661 and 1,049,996. The paper dyeings obtained with these dye-stuffs, however, are poorly bleachable or unbleachable with chlorine liquor.

It has not been found, surprisingly, that basic phthalocyaninesulphonamide dyestuffs which are very readily bleachable with chlorine liquor are obtained when the degree of sulphonation, and hence the number of basic sulphonamide groups, is restricted to 1.8 to 2.5 per Cu—Pc molecule and, at the same time, at least one of the basic sulphonamide groups is quaternised. These two measures are jointly necessary. Restricting the degree of sulphonation to 1.8 to 2.5 sulphonamide groups or quaternising a Pc dyestuff containing three or four basic sulphonamide groups alone is not enough to obtain dyestuffs which are readily bleachable. Said quaternisation additionally increases the resistance of the dyestuffs obtained according to the invention to hard water.

In addtition to having the very good bleachability already mentioned, the dyestuffs obtained according to the invention are distinguished by good to very good substantivity on paper. The paper dyeings obtained with these dyestuffs have good to excellent leaching fastness properties. The fact that the dyestuffs according to the invention are very readily soluble allows the preparation of liquid formulations, which are increasingly preferred in practice.

The dyestuffs are used for dyeing paper by conventional methods. The dyestuffs are preferably used for pulp-dyeing paper. For this the dyestuff solutions are added to the low-density or high-density pulp before the pulp is drained.

Other ways of applying the dyestuffs are as follows:

A solution of the dyestuff is sprayed onto the paper, or the undyed paper, before it reaches the dry end, is passed through a size press in the trough of which there is a solution of the dyestuff according to the invention. The paper dyed by spraying or dipping is then dried in the dry end.

EXAMPLE 1

75 mmol of a moist CuPc—(3)—(SO$_2$Cl)$_{2.2}$ paste are added to a mixture of 100 g of ice, 100 g of water, 22.5 ml of N-(3-aminopropyl)-morpholine and 8.5 g of magnesium oxide. The temperature is allowed to rise from 0° C. to 20° C. in the course of 3 hours, the mixture is stirred at 20°–25° C. for 2 hours, and the temperature is then raised at a rate of 10° C. per hour to 65° C. The mixture is stirred at 65° C. for 1 hour, is cooled down, is diluted with 90 ml of water, and is admixed with 23.5 ml of dimethyl sulphate in the course of 10 minutes. The mixture is then stirred at 20°–25° C. for 1 hour, at 30°–35° C. for 1 hour and at 50° C. for 30 minutes. 100 ml of 85% strength formic acid are added, and the solution is heated at 95° C. for 20 minutes, is cooled down to 20°–30° C., and is admixed with a further 40 ml of 85% strength formic acid. This gives 640 ml of a liquid dyestuff solution of the formula

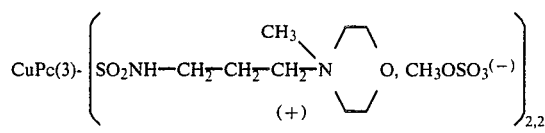

$\nu$max 608 nm which dyes paper in clear turquoise shades having very good chemical bleachability.

If the N-(3-aminopropyl)-morpholine used in Example 1 is replaced by equivalent amounts of the amines mentioned in column 2 of the following table, this gives dyestuffs of the formula Cupc—(3)—(SO$_2$Z)$_{2.2}$ in which Z has the meaning given in column 3 below. These dyestuffs too dye paper from a neutral to acid bath in turquoise hues and have very good chemical bleachability.

| Example | Amine | Z | Hue | λ max in nm |
|---|---|---|---|---|
| 1 b | H$_2$N—C$_3$H$_6$—N(CH$_3$)$_2$ | —N(H)—C$_3$H$_6$—N$^{(+)}$(CH$_3$)$_3$ CH$_3$OSO$_3^{(-)}$ | turquoise | 607 |
| 1 c | H$_2$N—C$_3$H$_6$—N(C$_2$H$_5$)$_2$ | —N(H)—C$_3$H$_6$—N$^{(+)}$(C$_2$H$_5$)$_2$CH$_3$ CH$_3$OSO$_3^{(-)}$ | " | 608 |
| 1 d | H$_2$N—C$_3$H$_6$—N(CH$_2$CH$_2$OH)(CH$_3$) | —N(H)—C$_3$H$_6$—N$^{(+)}$(CH$_3$)(CH$_2$CH$_2$OH)(CH$_3$) CH$_3$OSO$_3^{(-)}$ | " | 609 |
| 1 e | H$_2$N—C$_3$H$_6$—N(CH$_2$CH$_2$OH)$_2$ | —N(H)—C$_3$H$_6$—N$^{(+)}$(CH$_2$CH$_2$OH)$_2$CH$_3$ CH$_3$OSO$_3^{(-)}$ | " | 610 |
| 1 f | H$_2$N—C$_3$H$_6$—N(pyrrolidine) | —N(H)—C$_3$H$_6$—N$^{(+)}$(CH$_3$)(pyrrolidine) CH$_3$OSO$_3^{(-)}$ | " | 607 |
| 1 g | H$_2$N—C$_3$H$_6$—N(piperidine) | —N(H)—C$_3$H$_6$—N$^{(+)}$(CH$_3$)(piperidine) CH$_3$OSO$_3^{(-)}$ | " | 608 |
| 1 h | H$_2$N—CH(CH$_3$)—C$_3$H$_6$—N(CH$_2$CH$_3$)$_2$ | —N(H)—CH(CH$_3$)—C$_3$H$_6$—N$^{(+)}$(CH$_2$CH$_3$)$_2$CH$_3$ CH$_3$OSO$_3^{(-)}$ | " | 615 |
| 1 i | HN(CH$_3$)—C$_2$H$_4$—N(CH$_3$)$_2$ | —N(H)—C$_2$H$_4$—N$^{(+)}$(CH$_3$)$_3$ CH$_3$OSO$_3^{(-)}$ | " | 615 |
| 1 k | H$_2$N—C$_2$H$_4$—N(morpholine) | —N(H)—C$_2$H$_4$—N$^{(+)}$(CH$_3$)(morpholine) CH$_3$OSO$_3^{(-)}$ | " | 614 |

| Example | Amine | Z | Hue | λ max in nm |
|---|---|---|---|---|
| 1 l | HN⌐⌐N—CH₃ (piperazine) | —N⌐⌐N$^{(+)}$(CH₃)(CH₃) CH₃OSO₃$^{(−)}$ | " | 611 |
| 1 m | HN⌐⌐N—CH₂CH₃ | —N⌐⌐N$^{(+)}$(CH₃)(C₂H₅) CH₃OSO₃$^{(−)}$ | " | 610 |
| 1 n | HN⌐⌐N—CH₂—CH₂—OH | —N⌐⌐N$^{(+)}$(CH₃)(CH₂CH₂—OH) CH₃OSO₃$^{(−)}$ | " | 608 |
| 1 o | H₂N—C₂H₄—N(CH₃)(CH₃) | —NH—C₂H₄—N$^{(+)}$(CH₃)(CH₃)—CH₃ CH₃OSO₃$^{(−)}$ | " | 615 |
| 1 p | H₂N—C₂H₄—N(C₂H₅)(C₂H₅) | —NH—C₂H₄—N$^{(+)}$(C₂H₅)(C₂H₅)—CH₃ CH₃OSO₃$^{(−)}$ | " | 615 |

EXAMPLE 2

If the dimethyl sulphate used in Example 1 is replaced by equivalent amounts of the alkylating agents in column 2 below, this gives a dyestuff solution of the formula $$\text{CuPc(3)-}\left[SO_2NH-CH_2-CH_2-CH_2-\overset{(+)}{N}\underset{\diagdown}{\overset{R}{\diagup}}\text{O}\; X^{(-)}\right]_{2,2}$$

in which R and X have the meanings listed in the table below.

These dyestuffs too dye paper from neutral to acid solutions in readily bleachable turquoise shades.

and is then cooled down, and methyl chloride is forced in at 30° C. up to a pressure of 3 to 5 bar. The temperature is raised to 40° C. in the course of an hour and is maintained there until the pressure does not decrease any more. Excess methyl chloride is blown off, and 220 ml of 85% strength formic acid are added to the reaction mixture. This gives 900 ml of dyestuff solution of the formula $$\text{CuPc(3)-}\left[SO_2NH-CH_2-CH_2-CH_2-\overset{(+)}{N}\underset{\diagdown}{\overset{CH_3}{\diagup}}\text{O}\; Cl^{(-)}\right]_{2,2}$$

νmax 608 nm which dyes paper in turquoise shades having very good bleachability.

| Example | Alkylating agent | R | X$^{(−)}$ | Hue |
|---|---|---|---|---|
| 2 a | (C₂H₅)₂SO₂ | C₂H₅ | CH₃CH₂OSO₃$^{(−)}$ | turquoise |
| 2 b | CH₃—C₆H₄—SO₃CH₃ | CH₃ | CH₃—C₆H₄—SO₃$^{(−)}$ | " |
| 2 c | CH₃—C₆H₄—SO₃C₂H₅ | C₂H₅ | CH₃—C₆H₄—SO₃$^{(−)}$ | " |
| 2 d | CH₂OH—CHOH—CH₂Cl | CH₂OH—CHOH—CH₂ | Cl$^{(−)}$ | " |

EXAMPLE 3

150 mmol of a moist Cupc—(3)—(SO₂Cl)₂.₂ paste are added to 400 ml of ice/water and 50 ml of N-(3-aminopropyl)-morpholine in a pressure-resistant vessel. The temperature is allowed to rise from 0° C. to 20° C. in the course of 3 hours, 18 g of magnesium oxide are added, and the temperature is then raised at a rate of 10° C. per hour to 65° C. The mixture is held at 65° C. for 1 hour

EXAMPLE 4

150 mmol of a moist Cupc—(3)—(SO₂Cl)₂.₂ paste are added to 400 ml of ice/water and 50 ml of N-(3-aminopropyl)-morpholine in a pressure-resistant vessel. The temperature is allowed to rise from 0° C. to 20° C. in the course of 3 hours, 18 g of magnesium oxide are added, and the temperature is then raised at a rate of 10° C. per hour to 65° C. The mixture is held at 65° C. for 1 hour and is then cooled down, and 16 g of ethyl chloride are passed in at 20°-25° C. in the course of 15 minutes. The temperature is raised to 30° C. in the course of 1 hour, is maintained there for 1 hour, is raised in the course of 1 hour to 40° C. and is maintained there for 2 hours. The solution is diluted with 220 ml of 85% strength formic acid.

This gives a dyestuff solution of the formula

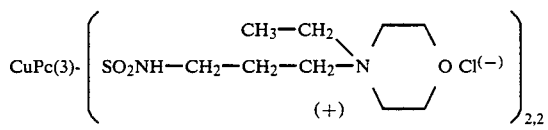

νmax 608 nm which dyes paper in turquoise shades and is readily chemically bleachable.

EXAMPLE 5

If the ethyl chloride mentioned in Example 4 is replaced by 24 g of methyl bromide, this gives a dyestuff of the formula

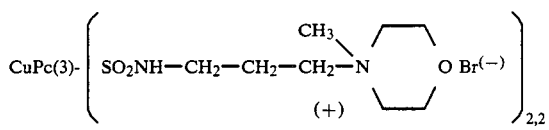

νmax 608 nm which corresponds in its properties to Example 4.

EXAMPLE 6

150 mmol of a moist Cupc—(3)—(SO₂Cl)₂,₂ paste are added to 400 ml of ice/water and 50 ml of N-(3-aminopropyl)-morpholine in a pressure-resistant vessel. The temperature is allowed to rise from 0° C. to 20° C. in the course of 3 hours, 18 g of magnesium oxide are added, and the temperature is then raised at a rate of 10° C. per hour to 65° C. The mixture is held at 65° C. for 1 hour and then cooled down, and 27 g of ethyl bromide are added dropwise at 20°-25° C. in the course of 15 minutes. The temperature is raised to 30° C. in the course of 1 hour, is held there for 1 hour, is raised to 40° C. in the course of 1 hour and is held there for 2 hours. The solution is diluted with 220 ml of 85% strength formic acid to give a dyestuff solution of the formula

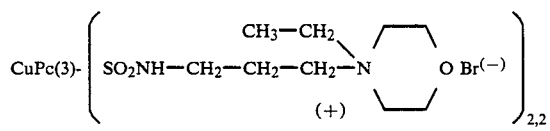

νmax 608 nm which dyes paper in turquoise shades and is chemically. readily bleachable.

EXAMPLE 6 a

If the ethyl bromide in Example 6 is replaced by 32.5 g of methyl iodide, this gives a dyestuff of the formula

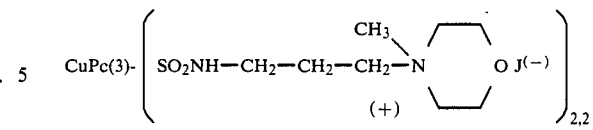

νmax 608 nm which corresponds in its properties to Example 6.

EXAMPLE 7

15 mmol of a moist Cupc—(3)—(SO₂Cl)₂,₂ paste are added to 5.3 ml of N-(3-aminopropyl)-morpholine in 40 ml of ice/water. The temperature is allowed to rise from 0° C. to 20° C. in the course of 2 hours and 30 minutes. As soon as the pH drops below 10.0 2N LiOH is added to maintain it at 10.0 to 9.5. The mixture is stirred at 20°-25° C. for 1 hour and is then heated at a rate of 5° C. per hour to 65° C., which is maintained for a further hour.

The batch is cooled down to 20°-25° C., 5.7 ml of dimethyl sulphate are added in the course of 10 minutes, and the batch is stirred for 1 hour. The temperature is raised from 20° C. to 40° C. in the course of 2 hours. The batch is then heated at 50° C. for 30 minutes. 20 ml of formic acid are added and the solution is raised to 95° C. for 30 minutes. This gives 100 ml of a turquoise solution which dyes paper in clear turquoise shades and is very readily bleachable.

EXAMPLE 7 b

Example 7 is repeated, except that the pH is maintained by means of 2N NaOH, affording 110 ml of a dyestuff solution which likewise dyes paper in clear turquoise shades and is very readily bleachable.

EXAMPLE 7 c

Example 7 is repeated, except that the pH is maintained by means of 2N KOH, affording 110 ml of a dyestuff solution which, in its properties, corresponds to Example 7 b.

EXAMPLE 8

Example 1 is repeated, except that 2.0 g of calcium oxide is used in place of the magnesium oxide, affording, after clarifying, a dyestuff solution which corresponds to Example 1.

EXAMPLE 9

75 mmol of a moist Cupc—(3)—(SO₂Cl)₂,₅ paste are added to a mixture of 100 g of ice, 100 g of water, 24.5 ml of N-(3-aminopropyl)-morpholine and 9.3 g of magnesium oxide. The temperature is allowed to rise from 0° C. to 20° C. in the course of 3 hours, the mixture is stirred at 20°-25° C. for 2 hours, and the temperature is then raised at a rate of 10° C. per hour to 65° C. The mixture is stirred at 65° C. for 1 hour, is cooled down, is diluted with 90 ml of water and is admixed with 25.5 ml of dimethyl sulphate in the course of 15 minutes. It is then stirred at 20°-25° C. for 1 hour, at 30°-35° C. for 1 hour and at 50° C. for 30 minutes. 100 ml of 85% strength formic acid are added, and the solution is heated at 95° C. for 20 minutes, is cooled down to 20°-30° C., and is diluted with a further 40 ml of 85% strength formic acid, to give 645 ml of a liquid dyestuff solution of the formula

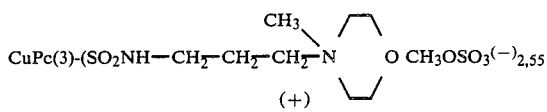

νmax 609 nm which dyes paper in clear turquoise shades having very good chemical bleachability.

If the N-(3-aminopropyl)-morpholine used in Example 9 is replaced by equimolar amounts of amines mentioned in column 2 of the table following Example 1, this gives dyestuffs of the formula

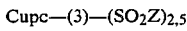

in which Z has the meaning mentioned in said table. These dyestuffs too dye paper, from a neutral to acid bath, in turquoise shades and can be chemically very readily bleached.

EXAMPLE 10

75 mmol of a moist Cupc—(3)—(SO$_2$Cl)$_{2,0}$ paste are added to a mixture of 100 g of ice, 100 g of water, 19.6 ml of N-(3-aminopropyl)-morpholine and 7.5 g of magnesium oxide. The temperature is allowed to rise from 0° C. to 20° C. in the course of 3 hours, the mixture is stirred at 20°-25° C. for 2 hours, and the temperature is then raised at a rate of 10° C. per hour to 65° C. The mixture is stirred at 65° C. for 1 hour, is cooled down, is diluted with 90 ml of water and is admixed with 20.5 ml of dimethyl sulphate in the course of 10 minutes. It is stirred at 20°-25° C. for 1 hour, at 30°-35° C. for 1 hour and at 50° C. for 30 minutes. 100 ml of formic acid are added, and the solution is heated at 95° C. for 20 minutes, is cooled down to 20°-30° C., and is diluted with a further 40 ml of 85% strength formic acid, to give 635 ml of a liquid dyestuff solution of the formula

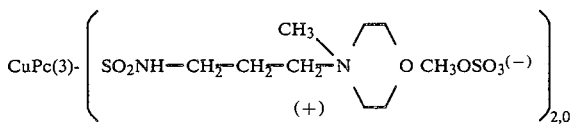

λ max 605 nm which dyes paper in clear turquoise shades having very good chemical bleachability.

If the N-(3-aminopropyl)-morpholine used in Example 10 is replaced by equimolar amounts of amines which are mentioned in the table following Example 1, this gives dyestuffs of the formula

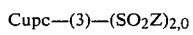

in which Z has the meaning listed in said table. These dyestuffs too dye paper, from a neutral to acid bath, in turquoise shades and can be chemically very readily bleached.

EXAMPLE 11

Example 1 is repeated, except that 135 ml of acetic acid are used in place of the 85% strength formic acid, affording 635 ml of a dyestuff solution which, in its properties, corresponds to Example 1.

EXAMPLE 11b

Example 1 is repeated, except that 140 ml of 2-methoxyacetic acid are used in place of 85% strength formic acid, affording 640 ml of a dyestuff solution which, in its properties, corresponds to Example 1.

EXAMPLE 11c

Example 1 is repeated, except that 140 ml of propionic acid are used in place of the 85% strength formic acid, affording 640 ml of a dyestuff solution which, in its properties, corresponds to Example 1.

EXAMPLE 11d

Example 1 is repeated, except that 135 ml of lactic acid are used in place of the 85% strength formic acid, affording 635 ml of a dyestuff solution which, in its properties, corresponds to Example 1.

EXAMPLE 12

Example 1 is repeated, except that, following the reaction with dimethyl sulphate, the pH is lowered to 1.5 to 1.8 by means of concentrated sulphuric acid, and, following the heating up and subsequent cooling, the solution is diluted with 130 ml of acetic acid, affording 635 ml of a dyestuff solution which, in its properties, corresponds to Example 1.

EXAMPLE 13

50 mmol of a moist Cupc—(3)—(SO$_2$Cl)$_{2,2}$ paste are added to a mixture of 16.9 g of N-(3-aminopropyl)-morpholine and 120 ml of ice/water. The temperature is allowed to rise from 0° C. to 20° C. in the course of 2 hours. When, about 2 hours later, the pH drops below 10.0, 4.3 g of magnesium oxide are added as an acid-binding agent. The temperature is raised to 65° C. at a rate of 5° C. per hour and is held at this value for 60 minutes, the batch is filtered hot with suction, and the filter residue is washed three times with, each time, 50 ml of water to which a little amine has been added to make it alkaline. 52.5 g of dyestuff base are obtained. 16.2 g (15 mmol) of this dyestuff base isolated as an intermediate are suspended in 35 ml of water and are stirred, together with 13.4 ml of dimethyl sulphate, at 20° C.-25° C. for 1 hour, at 30° C.-35° C. for 1 hour and at 50° C. for 30 minutes. The pH is brought to 1.8 to 1.5 by means of 85% strength formic acid, and this solution is heated to 95° C. for 30 minutes to give 50 ml of liquid dyestuff of the formula

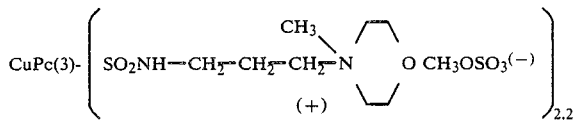

λ max 608 nm which dyes paper pulp in clear torquoise shades having very good bleachability.

If the N-(3-aminopropyl)-morpholine used in Example 13 is replaced by equimolar amounts of amines which are mentioned in the table following Example 1, this gives dyestuffs of the formula

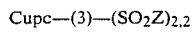

in which Z has the meaning given in said table. These dyestuffs too dye paper, from a neutral to acid bath, in turquoise shades and can be chemically very readily bleached.

EXAMPLE 14

16.2 g (15 mmol) of the dyestuff base isolated as an intermediate in Example 13 are suspended in 40 ml of water in a stirred autoclave. Methyl chloride is injected, with stirring, up to a pressure of 3 to 5 bar, and the temperature is raised to 40°–50° C. in the course of 1 hour. This temperature is then maintained until the pressure has ceased to decrease. A slightly alkaline pH is maintained by adding 0.5 g of magnesium oxide. Unconsumed methyl chloride is blown off. Adding 10 ml of 85% strength formic acid gives 50 ml of liquid dyestuff of the formula

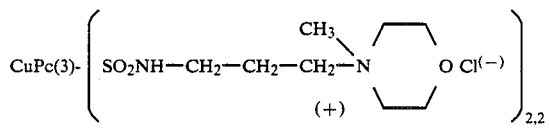

which in its properties corresponds to Example 13.

EXAMPLE 15

25 mmol of a moist Cupc—(3)—(SO$_2$Cl)$_{2,3}$ paste are suspended in 125 ml of water. 3.5 ml of dimethylaminopropylamine are added, and the temperature is raised to 40° C. The pH is held at 10.3–10.5 by means of 2N NaOH. As soon as 13.5 ml of 2N NaOH have been consumed, the mixture is cooled down to 25° C., is admixed with 2.65 ml of dimethyl sulphate and is stirred at 25°–30° C. for 1 hour. 14.8 ml of N-(2-aminoethyl)-piperazine are added and the temperature is raised to 70° C. in the course of 4 hours. The dyestuff suspension is filtered with suction, and the filter residue is washed with water. Drying gives 27.7 g of dyestuff of the formula

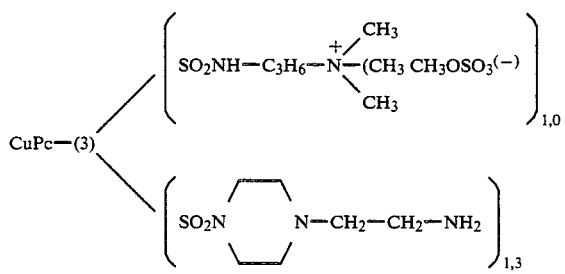

λ max 608 nm which is soluble in dilute acetic acid and which dyes paper in turquoise shades having very good chemical bleachability.

The above dyestuff is brought into a liquid formulation by dissolving it at 70° C. in 40 ml of water and 60 ml of glacial acetic acid by stirring for 1 hour, clarifying, and cooling down to 20°–25° C.

If the dimethylaminopropylamine used in Example 15 is replaced by equimolar amounts of amines which are mentioned in the table following Example 1, this gives dyestuffs of the formula

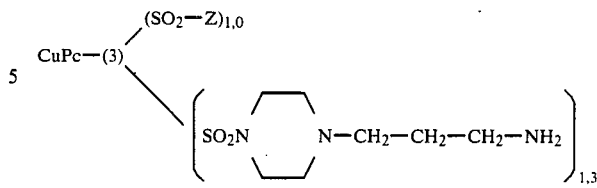

in which Z has the meaning given in said table. These dyestuffs too dye paper, from an acid solution, in turquoise shades having very good chemical bleachability.

EXAMPLE 16

16.0 g of Cupc—(3)—(SO$_2$Cl)$_{2,3}$ (20 mmol) in the form of a water-moist paste are suspended in 100 g of water. 2.24 g (22 mmol) of 1-amino-3-dimethylaminopropane are added and are allowed to react with the copper phthalocyaninesulphonyl chloride at pH 10.5 while allowing the temperature to rise to 40° C. and adding 11 ml (22 mmol) of 2N sodium hydroxide solution. The mixture is cooled down to 25° C., 0.2 g of MgO and 2.78 g (22 mmol) of dimethyl sulphate are added, and the mixture is stirred at 25°–30° C. for 1 hour. 13 g (90 mmol) of bis-(3-aminopropyl)-methylamine are then added, and the temperature of the reaction mixture is raised, with stirring, to 70° C. in the course of 4 hours. The dyestuff is then filtered off with suction and washed briefly with water. Drying gives 22.4 g of the dyestuff of the formula

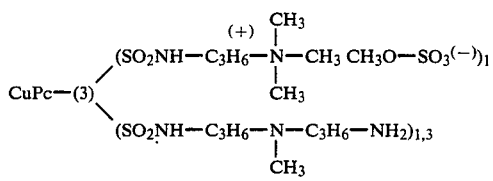

λ max 605 nm which is soluble in dilute acetic acid and is highly suitable for dyeing paper in turquoise shades. The resulting dyeings are readily bleachable with chlorine liquor. To bring the above dyestuff into a liquid formulation, it is dissolved in 40 g of water and 60 g of acetic acid by stirring at 70° C. for 1 hour, and the solution is cooled down to 25° C.

If the 1-amino-3-dimethylaminopropane used in paragraph 1 is replaced by equimolar amounts of amines mentioned in column 2 of the table below, this gives dyestuffs of the formula

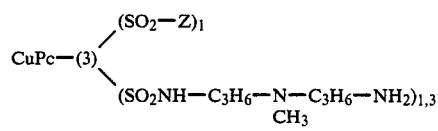

in which Z has the meaning given in column 3 of the table below. These dyestuffs too dye paper, from an acetic acid solution, in readily bleachable turquoise shades.

| Amine | Z | Colour | λ max (nm) |
|---|---|---|---|
| 16 b | HN—C₂N₄—N(CH₃)₂ with CH₃ on first N; —N(CH₃)—C₂H₄—N(+)(CH₃)₂—CH₃ CH₃O—SO₃(−) | turquoise | 605 |
| 16 c | H₂N—CH(CH₃)—C₃—H₆—N(C₂H₅)₂; —NH—CH(CH₃)—C₃H₆—N(+)(C₂H₅)₂—CH₃ CH₃O—SO₃(−) | " | " |
| 16 d | H₂N—C₃H₆—N(morpholine); —NH—C₃H₆—N(+)(morpholine) CH₃O—SO₃(−) | " | " |
| 16 e | NH(piperidine)—H—CH₃; —N(piperazine)N(+)—CH₃ CH₃O—SO₃(−) | " | " |

EXAMPLE 17

16.0 g of Cupc—(3)—(SO₂Cl)₂,₃ (20 mmol), in the form of a water-moist paste, are suspended in 100 g of water. 2.24 g (22 mmol) of 1-amino-3-dimethylaminopropane are added and are allowed to react with the copper phthalocyaninesulphonyl chloride at a pH of about 10.5 while raising the temperature to 40° C. and adding 11 ml (22 mmol) of 2N sodium hydroxide solution. The mixture is cooled down to 25° C., 2.78 g (22 mmol) of dimethyl sulphate are added, and the mixture is stirred at 25° C.-35° C. for one hour. 15.8 g (120 mmol) of bis-(3-aminopropyl)-amine are added, and the temperature of the reaction mixture is raised, with stirring, to 70° C. in the course of 4 hours. The dyestuff is then filtered off with suction and washed briefly with water. Drying gives 22 g of dyestuff of the formula

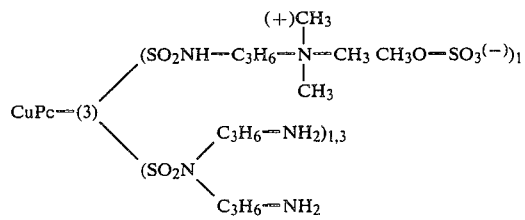

λ max=605 nm which is soluble in dilute acetic acid and is highly suitable for dyeing paper in turquoise shades. The resulting dyeings are readily bleachable with chlorine liquor. To bring the above dyestuff into a liquid formulation, it is dissolved in 40 g of water and 60 g of acetic acid by stirring at 70° C. for one hour, and the solution is cooled down to 25° C.

If the bis-(3-aminopropyl)-amine used in paragraph 1 is replaced by equimolar amounts of amines mentioned in column 2 of the table below, this gives dyestuffs of the formula

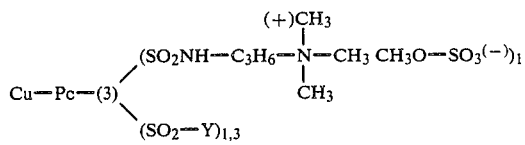

in which Y has the meaning given in column 3 of the table below. The dyestuffs dye paper, from an acetic acid solution, in readily bleachable turquoise shades.

| | Amine | Y¹ | Hue | λ max (nm) |
|---|---|---|---|---|
| 17 b | H₂N—C₂H₄—NH—C₂H₄—NH₂ | —N(C₂H₄—NH₂)(C₂H₄—NH₂) | turquoise | 605 |
| 17 c | H₂N—(C₂H₄—HN)₂—C₂H₄—NH₂ | —N(C₂H₄—NH₂)(C₂H₄—NH—C₂H₄—NH₂) | " | " |
| 17 d | H₂N—(C₂H₄—NH)₃—C₂H₄—NH₂ | —N(C₂H₄—NH—C₂H₄—NH₂)(C₂H₄—NH—C₂H₄—NH₂) | " | " |

| Amine | Y[1] | Hue | λ max (nm) |
|---|---|---|---|
| 17 e | $H_2N-(C_3H_6-NH)_2-C_3H_6-HN_2$ | $-N \begin{smallmatrix} C_3H_6-NH_2 \\ \\ C_3H_6-NH-C_3H_6-NH_2 \end{smallmatrix}$ | " | " |

[1]The structures shown under Y have to be regarded as mixtures, since every one of the amino groups present in the polyamine can react with the sulphochloride group of the phthalocyanine.

EXAMPLE 18

A dry stuff which consists of 50% of bleached pine sulphate pulp and 50% of bleached deciduous wood sulphate pulp is beaten in water in a hollander to a Schopper-Riegler freeness of 30°, so hat the solids content is slightly above 2.5% and is then accurately adjusted with water to 2.5% of the slush pulp.

200 parts of the slush pulp are admixed with 5 parts of a weakly acetic acid 1.5% strength aqueous solution of the dyestuff of Example 16, paragraph 1, and stirred for about 5 minutes. The pulp is then diluted with about 500 parts of water and is used to prepare sheets of paper in the conventional manner, namely by sucking off on a sheet former. The sheets of paper have a deep turquoise colour.

If the abovementioned dyestuff solution is replaced by weakly acetic acid or weakly formic acid 1-2% strength dyestuff solutions of dyestuffs which are described in the table of Example 16 under 16 b to e or in Example 17, this likewise gives sheets of paper which have a deep turquoise colour.

EXAMPLE 19

200 g of a 2.5% strength paper pulp which consists of 50% of bleached pine sulphate and 50% of bleached birch sulphite and has a Schopper-Riegler freeness of 35° is admixed with 0.5 g of the liquid dyestuff formulation of Example 1. It is then sized with 10 g of a 1% strength resin size solution and 20 g of a 1% strength aluminium sulphate solution and diluted with 500 g of water. The coloured pulp is stirred for 15 minutes, is poured onto a sheet former having a filter paper support, and is sucked off. The sheet of paper is couched between two sheets of filter paper and felts of the same size in a press and is then dried at 100° C. on a hot cylinder in the course of about 5 minutes. This gives a paper having a brilliant turquoise colour.

If the paper dyed in this way is broken up in water and the resulting suspension is treated at pH 7-2 with 1% active chlorine (relative to the paper material), this gives a virtually colourless paper stuff.

The other dyestuffs described in Example 1 and the dyestuffs produced in Examples 2-15 can be dyed analogously.

EXAMPLE 20

A size press solution which consists of 50 g of non-ionic starch and 20 g of size (ABS polymer) is admixed with 10 g of a liquid dyestuff formulation obtained in Example 1, and the raw papers or slightly sized papers are dyed at 20° C. at a throughout speed of about 5 to 7 m/min and under a pressure of about 25% (on a laboratory pad-mangle supplied by W. Mathis, Niderhasli, Switzerland), to give papers which have a level brilliant turquoise colour and which are readily bleached by means of chlorine liquor.

The other dyestuffs described in Example 1 and those described in Examples 2-17 can be dyed analogously. In each case papers which have a brilliant turquoise colour and good bleachability are obtained.

We claim:

1. Basic copper phthalocyanine dyestuffs of the general formula $$Cu-Pc \begin{cases} \left( SO_2-N-A-N-R_3^{(+)} X^{(-)} \atop \begin{smallmatrix} | \\ R_1 \end{smallmatrix} \begin{smallmatrix} | \\ R_2 \end{smallmatrix} \begin{smallmatrix} | \\ R_4 \end{smallmatrix} \right)_m \\ \left( SO_2-N-B-N \begin{smallmatrix} R_6 \\ \\ R_7 \end{smallmatrix} \atop \begin{smallmatrix} | \\ R_5 \end{smallmatrix} \right)_n \end{cases} \quad (I)$$

in which
Cu-Pc denotes the radical of an m+n-valent copper phthalocyanine radical,
A denotes alkylene
B denotes a radical of the formula $$-\text{alkylene}-(\overset{R_8}{\underset{|}{N}}-\text{alkylene})_p-$$

$R_1$ denotes hydrogen or alkyl,
$R_2$, $R_3$ and $R_4$, independently of one another, denote alkyl which can be substituted by hydroxyl or alkoxy groups,
$R_5$ denotes hydrogen, alkyl or aminoalkyl,
$R_6$ and $R_7$, independently of each other, denote hydrogen or alkyl which can be substituted by hydroxyl, alkoxy or amino groups, and
$R_8$ denotes hydrogen or alkyl, or
$R_1$ can form a closed ring with $R_2$,
$R_2$ can form a closed ring with $R_3$,
$R_5$ can form a closed ring with $R_6$ and/or
$R_6$ can form a closed ring with $R_7$,
m denotes a number from 1.0 to 2.5,
n denotes a number from 0 to 1.4, but is 0 only if $R_2$ forms a closed ring with $R_3$,
m+n is 1.8 to 2.5,
p denotes 0, 1, 2 or 3 and
$X^{(-)}$ denotes an anion.

2. Basic copper phthalocyanine dyestuffs according to claim 1 of the general formula

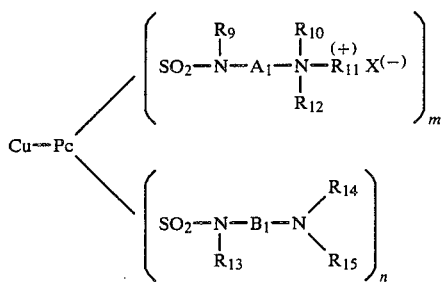

in which $A_1$ denotes $C_2$–$C_5$-alkylene, $B_1$ denotes a radical of the formula $C_2$– or

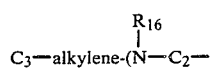

or $C_3$-alkylene)$_p$–

$R_9$ denotes hydrogen or $C_1$–$C_4$-alkyl, $R_{10}$, $R_{11}$ and $R_{12}$, independently of one another, denote methyl or $C_2$–$C_4$-alkyl which can be substituted by a $C_1$–$C_4$-alkoxy or one or two hydroxyl groups, $R_{13}$ denotes hydrogen, methyl or $C_2$–$C_4$-alkyl which can be substituted by an amino group, $R_{14}$ and $R_{15}$, independently of one another, denote hydrogen, methyl or $C_2$–$C_4$-alkyl which can be substituted by a $C_1$–$C_4$-alkoxy or amino group or one or two hydroxyl groups, and $R_{16}$ denotes hydrogen or $C_1$–$C_4$-alkyl, or $R_9$, $R_{10}$ and —N—$A_1$—N— conjointly form a piperazine ring, $R_{13}$, $R_{14}$ and —N—$B_1$—N— conjointly form a piperazine ring, $R_{10}$ and $R_{11}$ and/or $R_{14}$ and $R_{15}$ conjointly with the nitrogen atom form a pyrrolidine, piperazine, morpholine or piperazine ring which can carry a methyl or an optionally hydroxyl- or amino-substituted $C_2$–$C_4$-alkyl radical, the sum of m and n=2.0 to 2.3, p is 1, 2 or 3, and n is 0 only if $R_{10}$ forms a ring with $R_{11}$.

3. Basic copper phthalocyanine dyestuffs of the formula of claim 2, in which $A_1$ represents 1,2-ethylene or 1,3-propylene, $R_9$ and $R_{13}$ represent hydrogen or methyl, $R_{10}$, $R_{11}$ and $R_{12}$, independently of one another, represent methyl, ethyl, 2-hydroxyethyl or 2,3-dihydroxypropyl, $R_{14}$ and $R_{15}$ represent hydrogen, and $R_{16}$ represents hydrogen or methyl, or $R_9$, $R_{10}$ and —N—$A_1$—N— conjointly form a piperazine ring, $R_{10}$ and $R_{11}$ conjointly with the nitrogen atom form a morpholine ring, and/or $R_{13}$, $R_{14}$ and —N—$B_1$—N— conjointly form a piperazine ring.

4. Basic copper phthalocyanine dyestuffs of the formula of claim 2 in which n is 0 and $R_{10}$ and $R_{11}$ conjointly with the nitrogen atom form a pyrrolidine, piperidine, morpholine or piperazine ring which carries a methyl or an optionally hydroxyl- or amino-substituted $C_2$–$C_4$-alkyl radical.

5. Basic copper phthalocyanine dyestuffs according to claim 2 of the formula

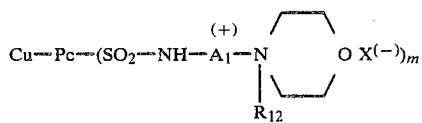

in which m is 2.0–2.3.

6. Basic copper phthalocyanine dyestuff of the formula

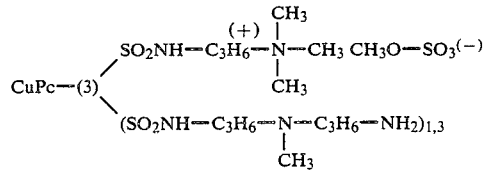

UNITED STATES PATENT AND TRADEMARK OFFICE
CERTIFICATE OF CORRECTION

PATENT NO. : 4,537,721           Page 1 of 2
DATED : August 27, 1985
INVENTOR(S) : Manfred Groll, et al.

It is certified that error appears in the above-identified patent and that said Letters Patent is hereby corrected as shown below:

| | |
|---|---|
| Col. 4, line 37 | Delete "dye-stuffs" and substitute --dyestuffs-- |
| Col. 4, line 58 | Delete "leaching" and substitute --bleaching-- |
| Col. 6, line 9; Col. 7, line 41; Col. 8, line 44; Col. 9, lines 17, 32, 59; Col. 10, line 7; Col. 12, line 54 and Col. 13, line 22 | End of formula delete "2,2" and substitute --2.2-- |
| Col. 6, line 10; Col. 8, line 45; Col. 9, lines 19, 34, 61; Col. 10, line 9, and Col. 11, line 8 | Delete "$\nu$" and substitute --$\lambda$-- |
| Col. 9, line 62 | After "chemically" delete "." |
| Col. 11, line 4 | End of formula delete "2,55" and substitute --2.55-- |
| Col. 11, line 44 | End of formula delete "2,0" and substitute --2.0-- |
| Col. 12, line 46 | Before "95°C." delete "to" and substitute --at-- |
| Col. 13, line 49 | End of formula delete "1,0" and substitute --1.0-- |
| Col. 13, line 54; Col. 14, lines 9, 41, 62; Col. 15, line 48 and Col. 20, line 44 | End of formula delete "1,3" and substitute --1.3-- |

UNITED STATES PATENT AND TRADEMARK OFFICE
CERTIFICATE OF CORRECTION

PATENT NO. : 4,537,721

DATED : August 27, 1985

INVENTOR(S) : Manfred Groll, et al.

It is certified that error appears in the above-identified patent and that said Letters Patent is hereby corrected as shown below:

Col. 17, line 11      Delete "dry stuff" and substitute --dyestuff--

Col. 17, line 15      Delete "hat" and substitute --that--

Col. 18, line 25      Delete "(I)" next to formula

Signed and Sealed this

Eleventh Day of March 1986

[SEAL]

Attest:

Attesting Officer

DONALD J. QUIGG

Commissioner of Patents and Trademarks